United States Patent [19]

Hill

[11] Patent Number: 5,022,624

[45] Date of Patent: Jun. 11, 1991

[54] ADJUSTABLE SUPPORT FOR HOT WATER TANKS, OR THE LIKE

[76] Inventor: Joe A. Hill, 3161 Via Alicante Dr., La Jolla, Calif. 92037

[21] Appl. No.: 475,866

[22] Filed: Feb. 6, 1990

[51] Int. Cl.$^5$ .............................................. E04G 3/00
[52] U.S. Cl. .................................. 248/274; 248/68.1; 248/289.1
[58] Field of Search ............ 248/313, 146, 154, 311.2, 248/309.1, 312, 274, 298, 285, 287, 70, 74.1, 68.1, 289.1; 211/88; 52/67

[56] References Cited

U.S. PATENT DOCUMENTS

| | | | |
|---|---|---|---|
| 883,138 | 3/1908 | Kirchhoff | 248/70 |
| 1,012,063 | 12/1911 | Davis | 248/70 |
| 1,022,409 | 4/1912 | Foster | 248/70 |
| 1,050,235 | 1/1913 | Scanlan | 248/74.1 X |
| 1,077,727 | 11/1913 | Loepsinger | 248/70 |
| 1,162,608 | 11/1915 | Hohl | 248/285 X |
| 1,373,716 | 4/1921 | Dottl | 248/74.1 X |
| 1,549,291 | 8/1925 | Broman | |
| 1,709,898 | 4/1929 | Cunneen | 248/70 |
| 1,855,545 | 4/1932 | Englund | 248/287 X |
| 2,141,032 | 12/1938 | Cordell | 248/70 |
| 2,660,391 | 11/1958 | Passman | |
| 3,730,472 | 5/1973 | Dale | 248/300 |
| 4,463,510 | 8/1984 | Windish | |
| 4,657,215 | 4/1987 | Murphy | |
| 4,708,312 | 11/1987 | Rohr | |

*Primary Examiner*—J. Franklin Foss
*Attorney, Agent, or Firm*—Lyon & Lyon

[57] ABSTRACT

A domestic hot water tank, or the like, is firmly supported against toppling or swaying that may be induced by earthquake activity by a mounting assembly comprising a support bracket adapted to be securely attached to an adjacent building structure, such as a wall, extension arms adjustably positionable along the support bracket, and clamping members carried by the respective extension arms to engage the water tank, particularly at the inlet and outlet pipes that conduct water to and from the tank. The disclosed mounting assembly is characterized by low cost, ease of installation and flexibility of use.

4 Claims, 1 Drawing Sheet

ADJUSTABLE SUPPORT FOR HOT WATER TANKS, OR THE LIKE

BACKGROUND OF THE INVENTION

This invention relates to mounting assemblies and particularly, to mounting assemblies especially adapted for securing a domestic tank-type water heater, or the like, to an adjacent building structure in order to stabilize the heater, as for example, during earthquakes.

Tank-type water heaters, particularly those for domestic use, are generally substantially free-standing members deriving their only support, other than at their support pedestal, from the water conductors and other conduits, such as a flue, that may extend between the tank and an adjacent building structure. Because water piping to and from present-day water heater tanks is generally formed of light gauge materials, such as copper or plastic, little structural support can be derived from them. Similarly, the flue being of light-gauge metal, can provide little support to prevent the heater from toppling during earth tremors of sufficient magnitude.

An unstable water heater, regardless of whether the heat source is electric or gas, presents a dangerous condition during earthquakes. A gas-fired water heater under such conditions, of course, can create a much more hazardous situation in that any rupturing of the gas line can result in the creation of an explosive atmosphere.

It is to the amelioration of these problems, therefore, to which the present invention is directed.

SUMMARY OF THE INVENTION

According to the present invention there is provided a mounting assembly apparatus for securing a domestic water heater, or the like, to an adjacent building structure. The apparatus, in a broad sense, comprises a support bracket, means for attaching the support bracket to the building structure, and at least one extension arm selectively positionable along the support bracket and carrying a clamping device for securing the water heater. The support bracket preferably contains a plurality of longitudinally spaced holes for the reception of a connector to secure the extension arm or arms at one end to a selected bracket opening. The support bracket may be an L-shaped member whose long leg contains the spaced openings and whose angularly displaced short leg contains openings to receive lag bolts, or the like, for attaching the support bracket to the adjacent building structure.

Since tank-type water heaters conveniently contain a pair of tubular connections, representing the water inlet and outlet, respectively, and these connections normally each comprise a rigid upstanding nipple for threaded connection of the water lines, the invention contemplates the use of a pair of angularly disposed extension arms each being attached at one end to the support bracket with the other end mounting an angle bracket that secures a clamping member so that the assembly is secured to both nipples on the heater.

In its preferred form, with the exception of the attachment of the support bracket to the building structure, all connections between the members are made by way of threaded connectors that are capable of an initial loose connection until the respective members of the assembly are positionally adjusted between the support bracket and the heater and a subsequent snug connection after final positioning is complete.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENT

Figure 1:
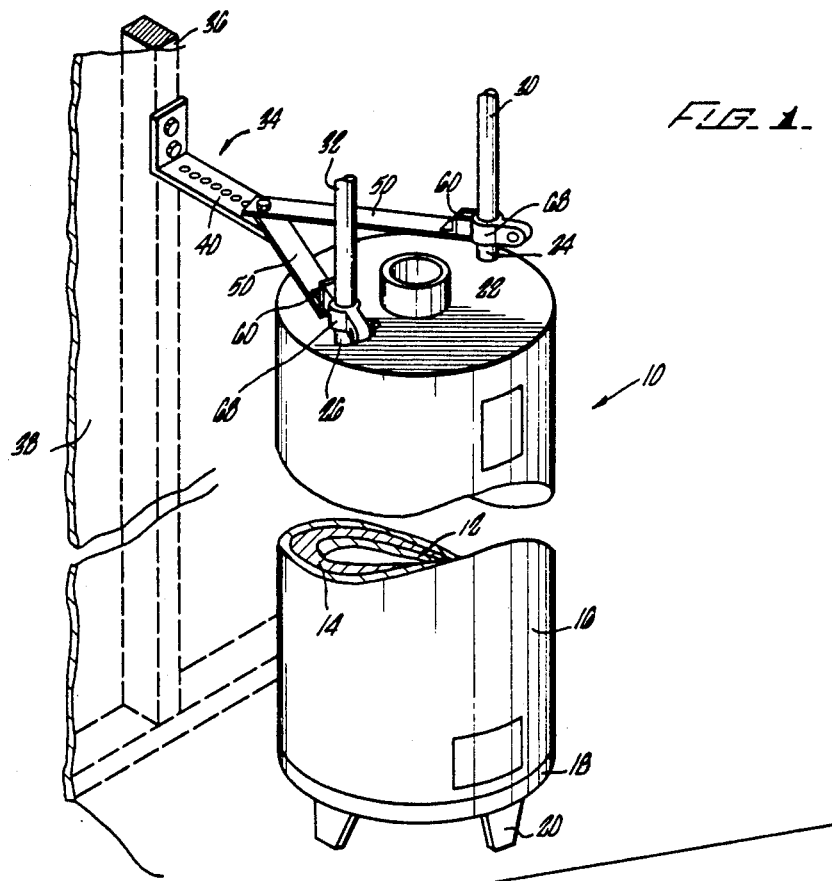
FIG. 1 a perspective view of a domestic-type water tank connected to a building structure by way of the mounting assembly of the present invention.
Figure 2:
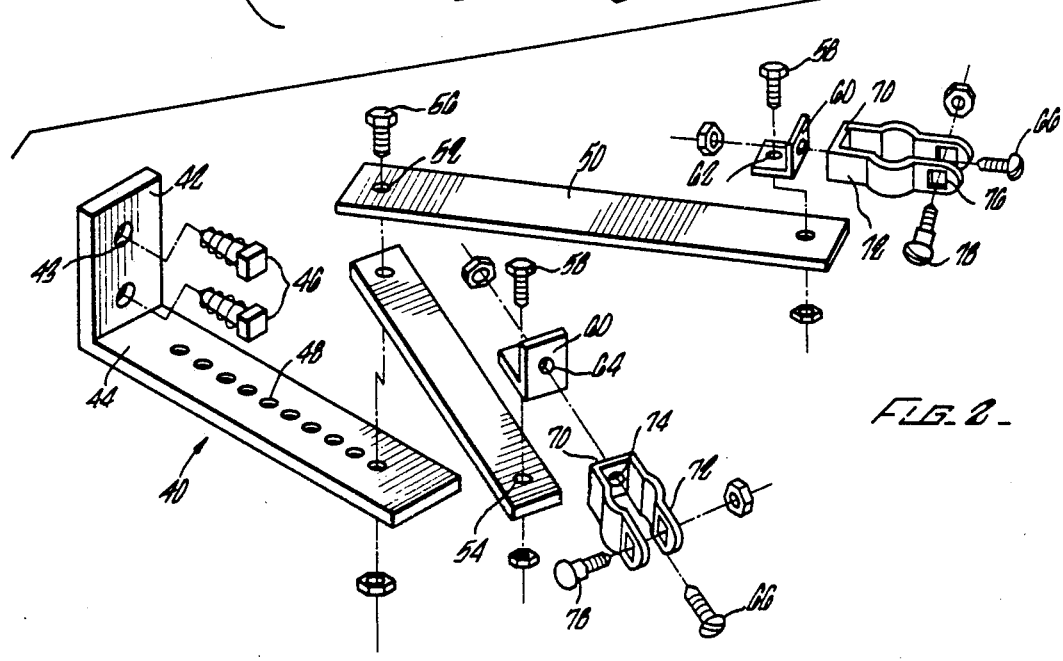
FIG. 2 an exploded perspective view of the mounting assembly shown in FIG. 1.

FIG. 1 depicts a conventional domestic tank-type water heater 10 in the form of an upstanding, relatively thin-walled, cylindrical tank 12 surrounded by insulation 14 and a housing 16. The structure is supported at its bottom end to be essentially free-standing by a pedestal 18 containing a plurality of circumferentially spaced legs 20.

The disclosed heater 10 is of the gas-fired type and has a flue 22 extending from the upper end of the housing 16 for the discharge of combustion gases. Also extending from the upper end of the housing 16 are a pair of upstanding nipples, 24 and 26, adapted to connect, by way of threaded couplings 28, thin-walled cooper or plastic tubes defining the water inlet and outlet lines 30 and 32, respectively.

The water heater 10 is provided with lateral support by a mounting assembly, identified generally by the numeral 34, that effects a supportive connection between the heater and an adjacent building structure, here shown as a stud 36 in an upstanding wall 38. The mounting assembly 34 comprises a support bracket 40 in the form of a rigid L-shaped member having angularly displaced legs 42 and 44. Leg 42 is arranged for vertical disposition on the wall 38 in overlying relation to a conveniently located stud 36. This leg contains a pair of openings 43 for reception of lag screws 46 to securely attach the support bracket 40 to the stud 36. The other leg 44 of the bracket 40 is generally horizontally disposed and contains a plurality of through-holes 48 located in spaced, longitudinal alignment.

The described mounting assembly 34 also contains a pair of angularly disposed extension arms 50 formed of elongated metal members. Each of the extension arms 50 contains through-bores, 52 and 54, adjacent the respective ends of the arms. In the preferred embodiment, the through-bores 52 in both extension arms 50 are placed in mutual registration for reception of a bolt 56 for the threaded connection of the arms at their ends to a selected one of the holes 48 in the bracket 40. It is obvious that the connection can be made at any one of the holes 48 depending upon the position of the heater 10 with respect to the stud 36.

The bores 54 at the other end of each arm 50 each receive a threaded bolt 58 that mounts an angle bracket 60. As shown, the angle brackets 60 each contain bores 62 adapted to register with the bores 54 whereby they are threadedly connected by the bolt 58 and its associated nut. The upstanding legs of the brackets 60 also contain bores 64 that serve for reception of screws 66 which attach a clamp 68 to each bracket.

The clamps 68 are generally U-shaped members that comprise a base 70 and a pair of oppositely spaced arms 72. The bases 70 each contain an opening 74 for registering with the bores 64 in the brackets 60 and for reception of the screws 66. The arms 72, at their free ends, contain rectangularly sided openings 76 adapted to receive clamping bolts 78 whose shanks contain a rectangular portion between the head and threads for reception in the openings 76. The arms may also contain oppositely facing arcuate recesses 80 to enhance engagement of the clamps 68 with the respective nipples 24 and 26.

The installation of the described mounting assembly is as follows. Once a stud 36, which is conveniently located with respect to the heater 10, is identified, the support bracket 40 is securely fastened thereto by means of the lag screws 46 passing through the openings 43 in the short leg 42. The arms 50 mounting the angle brackets 60 and having clamps 68 loosely boltedly-connected thereto, are then loosely connected to the horizontal arm 44 of the bracket 40 by passing bolt 56 through the aligned openings 52 and thence through a selected one of the openings 48. (Alternatively, the holes 52 can be boltedly connected to different ones of the holes 48 where conditions may dictate.) Thereafter, the clamps 68 are made to engage the nipples 24 and 26 and the lock bolts 78 passed through the openings and secured by the associated nuts.

Since all of the bolt connections at this point are loose, the elements of the assembly can essentially seek their own positions without imposing any undesirable stress, either on the elements of the mounting assembly 34 or the piping connections of the water heater 10. When all positional adjustments have been completed, all of the bolted connections are made to a snug tightness thus to securely attach the water heater to the building structure and thereby stabilize it against toppling or swaying, as may be caused by earth tremors of sufficient proportions.

It should be further understood that, although a preferred embodiment of the invention has been illustrated and described herein, changes and modifications can be made in the described arrangement without departing from the scope of the appended claims.

I claim:

1. Apparatus for securing a water heater, or the like, having a housing and a pair of mutually spaced nipples extending upwardly therefrom to an adjacent building structure, said apparatus comprising:
   a support bracket defined by a generally L-shaped member having angularly displaced legs, one of which legs contains a plurality of longitudinally spaced holes;
   means received by the other of said legs for attaching said support bracket to said building structure;
   arm means including a pair of angularly disposed extension arms each containing a bore at one end for selective registration with one of said support bracket holes and at the other end mounting nipple-securing means including an angle bracket connected to said extension arms and retaining a bolt-connected clamp having means for securing one of said nipples.

2. Apparatus according to claim 1 in which the bores at the said one end of each of said extension arms register with the same support bracket hole, and a bolt extending through said bores and said hole for connecting said arms to said bracket.

3. Apparatus for securing a water heater, or the like, having a housing including a top surface containing a pair of spaced, upstanding nipples to an adjacent building structure, said apparatus comprising:
   a support bracket defined by a generally L-shaped member having angularly displaced legs, one of which legs contains a plurality of longitudinally spaced holes;
   means received by the other of said legs for attaching said support bracket to said building structure;
   a pair of angularly disposed extension arms containing through-bores at opposite ends thereof;
   a bolt securing the bores at one end of each of said arms to one of said support bracket holes;
   an angle bracket at the other end of each of said extension arms;
   bolts for making the connection between said angle brackets and said extension arms; and
   a clamp boltedly connected to each of said angle brackets for effecting connection between each of said extension arms and the respective of said nipples.

4. Apparatus according to claim 3 in which each said bolt and bolted connection is adapted for initial loose connection of the members connected thereby and subsequent rigid connection thereof.

* * * * *